United States Patent [19]

Hirota et al.

[11] 3,932,224

[45] Jan. 13, 1976

[54] METHOD OF PREVENTING SCALE FROM BEING DEPOSITED IN CASE OF PRODUCING FRESH WATER FROM SEA WATER

[75] Inventors: Kunio Hirota, Hitachi; Yoshinori Takata, Tokai; Yoshijiro Arikawa, Hitachi; Kazuo Tanno, Hitachi; Yoshiaki Okajima, Hitachi, all of Japan

[73] Assignee: Keishin Matsumoto Director-General of the Agency of Industrial Science and Technology, Tokyo, Japan

[22] Filed: Dec. 16, 1974

[21] Appl. No.: 532,814

Related U.S. Application Data

[63] Continuation-in-part of Ser. No. 442,670, Feb. 14, 1974, abandoned.

[30] Foreign Application Priority Data

Feb. 22, 1973 Japan................................ 48-20628

[52] U.S. Cl................ 203/7; 203/11; 203/DIG. 17; 159/DIG. 13; 210/46; 210/58; 252/180; 252/181

[51] Int. Cl.²...................... B01D 1/26; C23F 11/00
[58] Field of Search........................... 203/7, 10, 11; 159/DIG. 13, DIG. 31; 252/180, 181, 82, 86, 87; 202/173; 210/46, 57, 58

[56] References Cited
UNITED STATES PATENTS

| | | | |
|---|---|---|---|
| 2,979,442 | 4/1961 | Badger | 203/7 |
| 3,347,797 | 10/1967 | Kuegemann et al. | 252/181 |
| 3,578,589 | 5/1971 | Hwa et al. | 252/180 |

*Primary Examiner*—Wilbur L. Bascomb, Jr.

[57] ABSTRACT

A method of preventing scale from being deposited in case of producing fresh water from sea water by heating the sea water in a vapour pressure type evaporator and multiple stage flush evaporator and by condensing water vapour evolved to obtain the fresh water comprising adding to the sea water small amount of seed crystal selected from the group consisting of calcium carbonate and magnesium hydroxide together with a surface active agent selected from the group consisting of a nonionic active agent and cation surface active agent.

6 Claims, 1 Drawing Figure

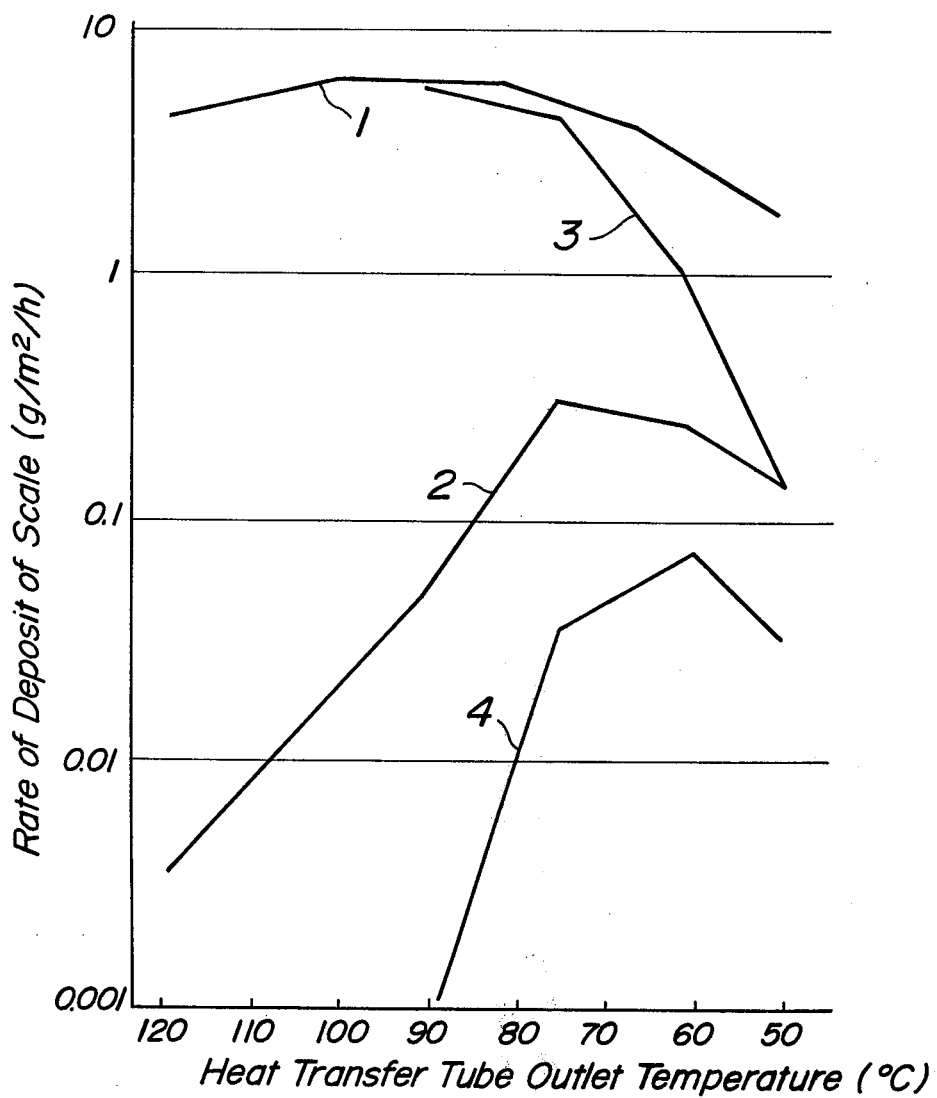

METHOD OF PREVENTING SCALE FROM BEING DEPOSITED IN CASE OF PRODUCING FRESH WATER FROM SEA WATER

This invention relates to a method of preventing scale from being deposited on the inside wall of a vessel as a multiple-effect steam boiler, steam boiler type evaporator and the like when it is operated to produce fresh water from sea water. This application is a Continuation-In-Part Application of U.S. application Ser. No. 442,670 filed Feb. 14, 1974, by Kunio Hirota, Yoshinori Takata, Yoshijiro Akikawa, Kazuo Tanno and Yoshiaki Okajima and now abandoned.

Heretofore, it has been the common practice to use a multiple stage flash evaporator, multiple-effect steam boiler, steam boiler type evaporator in which sea water is heated to evaporate it and water vapour evolved is condensed to obtain fresh water.

Sea water dissolves therein various kinds of compounds, particularly alkali metal salts and alkaline earth metal salts. Among these compounds, calcium salt and magnesium salt are deposited as calcium sulfate, calcium carbonate and magnesium hydroxide, respectively, as the sea water is concentrated. The solubility of these compounds becomes lowered as the temperature of the sea water rises. The boiling point of the sea water rises as the sea water is concentrated, and as a result, calcium carbonate or magnesium hydroxide or calcium sulfate is easily deposited as scale on the heat transfer surface with which sea water is in contact.

In the method of producing fresh water from sea water heretofore proposed, it is considered that the higher the degree of concentration of the sea water, the better the gain of the fresh water. Recently, it has been deemed that the concentration ratio preferably be smaller than 2 at a brine temperature of lower than about 120°C by taking the thermal efficiency into consideration. The concentration ratio is a ratio of the amount of Cl⁻ in the brine to the amount of Cl⁻ in the natural sea water when the latter is assumed to be 1. Under such condition, calcium sulfate is not deposited as scale, while so-called alkaline scale containing calcium carbonate and magnesium hydroxide as the principal component is deposited. In the above described method of producing fresh water from sea water, therefore, it is necessary to prevent the alkaline scale from being deposited.

As the method of preventing the alkaline scale from being deposited, there is a method of adding a seed crystal to sea water and another method of adding an inhibitor to the sea water. In the method of adding the seed crystal to the sea water, either or both of calcium carbonate and magnesium hydroxide which are contained in the alkaline scale is or are added to the sea water. This addition permits the scale to be grown as a crystal on the seed crystal instead of depositing it on the heat transfer surface, thereby preventing the scale from being deposited on the heat transfer surface.

The use of the seed crystal only, however, is insufficient to make the scale grown on the seed crystal, and as a result, the scale is deposited on the inside vessel wall.

In the method of adding the inhibitor to sea water, phosphoric acid compounds and high molecular organic compounds such as polyacrylic acid and the like are added to the sea water. These compounds serve to maintain the scale components in the sea water in oversaturated state, thereby preventing these scale components from being deposited as the scale. This method of adding the inhibitor to sea water has the disadvantage that the scale component in the brine is accumulated during continuous evaporation of the sea water so that it is impossible to prevent the scale from being deposited for a long time.

An object of the invention is to provide a method whereby scale is effectively prevented from being deposited on the heat transfer surface of an apparatus for producing fresh water from sea water.

Another object of the invention is to provide a method whereby the amount of seed crystal can be reduced if compared with that used in the conventional method in which seed crystal only is added to sea water.

The invention is concerned with a method of preventing alkaline scale from being deposited in case of producing fresh water from sea water by heating the sea water in a vapour pressure type evaporator and multiple state flash evaporator and by condensing water vapour evolved to obtain the fresh water, comprising adding to the sea water a small amount of a seed crystal selected from the group consisting of calcium carbonate and magnesium hydroxide and at least one surface active agent selected from the group consisting of nonionic surface active agent and cation surface active agent.

In the present invention, temperature of sea water is controlled to about 120°C or lower so as to prevent deposition of a hard scale on the heat transfer surface. For example, when sea water is heated at 120°C, the temperature is regulated to 120°±3°C.

The sole FIGURE of the accompanying drawing is a graphical representation of the relation between the heat transfer tube outlet temperature and the rate of deposit of scale obtained by the conventional methods as well as by the method according to the invention.

In the method according to the invention, use is made of at least one seed crystal selected from the group consisting of calcium carbonate and magnesium hydroxide contained in sea water as the principal component of alkaline scale.

There are two kinds of surface active agents, one of which is capable of improving the dispersion effect for the scale crystal and the other is capable of improving the flocculation effect for the scale crystal. The surface active agent for use in producing fresh water from sea water and having an improved dispersion effect for the scale crystal and hence preventing scale from being deposited on the heat transfer surface has heretofore been investigated. However, almost no investigation has been made how to obtain the crystalline growth of the scale on the seed crystal with the aid of the flocculation effect for the scale crystal, because it has been considered that the surface active agent exhibiting the flocculation effect for the scale crystal if used in the apparatus for producing fresh water from sea water would expedite the deposit of scale on the heat transfer surface.

Inventor's experimental tests have hielded the result that the surface active agent exhibiting no flucculation effect for the scale crystal but making the scale component grown on the seed crystal is effective to prevent the scale from being deposited. It is considered that these surface active agents have their single molecule adhered to fine grains of the scale component, and as a result, can mitigate the electric charge of the scale component, whereby the scale component is easily grown on the seed crystal.

The surface active agent having the above described effect is a cation surface active agent which is quaternary ammonium salt and a nonionic surface active agent such as polyoxyethylene alkylamine that contains in its molecule a nitrogen atom having a weak positive electric charge.

The cation surface active agent is alkyldimethylbenzyl ammonium chloride, alkenyldimethylbenzyl ammonium chloride, acyldimethylbenzyl ammonium chloride, the carbon number of the alkyl group, alkenyl group and acyl group being 10 to 20. The molecular weight of these compounds is 200 to 600.

Examples of the alkyldimethylbenzyl ammonium chloride type cation surface active agents are decyldimethylbenzyl ammonium chloride, undecyldimethylbenzyl ammonium chloride, dodecyldimethylbenzyl ammonium chloride, tridecyldimethylbenzyl ammonium chloride, tetradecyldimethylbenzyl ammonium chloride, pentadecyldimethylbenzyl ammonium chloride, cetyldimethylbenzyl ammonium chloride, stearyldimethylbenzyl ammonium chloride, heptadecyldimethylbenzyl ammonium chloride, nonadecyldimethylbenzyl ammonium chloride, and eicosyldimethylbenzyl ammonium chloride. Examples of acyldimethylbenzyl ammonium chloride type cation surface active agents are decanoyldimethylbenzyl ammonium chloride, undecanoyldimethylbenzyl ammonium chloride, dodecanoyldimethylbenzyl ammonium chloride, tridecanoyldimethylbenzyl ammonium chloride, tetradecanoyldimethylbenzyl ammonium chloride, pentadecanoyldimethylbenzyl ammonium chloride, hexadecanoyldimethylbenzyl ammonium chloride, heptadecanoyldimethylbenzyl ammonium chloride, octadecanoyldimethylbenzyl ammonium chloride, nonadecanoyldimethylbenzyl ammonium chloride, and eicosanoyldimethylbenzyl ammonium chloride. As an alkenyldimethylbenzyl ammonium chloride, oleyldimethylbenzyl ammonium chloride can be used.

As the nonionic surface active agent, use may be made of polyoxyethylenealkylamine, polyoxyethylenealkenylamine, and polyoxyethyleneacylamine. It is preferable that these compounds have a molecular weight on the order of 500 to 1,000. The carbon number of the alkyl group, alkenyl group and acyl group is 10 to 20.

Examples of the polyoxyethylenealkyl amine type nonionic surface active agents are polyoxyethylenedecylamine, polyoxyethyleneundecylamine, polyoxyethylenedodecylamine, polyoxyethylenetridecylamine, polyoxyethylenetetradecylamine, polyoxyethylenepentadecylamine, polyoxyethyleneheptadecylamine, polyoxtethylenecetylamine, polyoxyethylenestearylamine, polyoxyethylenenonadecylamine, and polyoxyethyleneeicosylamine. Examples of polyoxyethyleneakenylamine is polyoxyethyleneoleylamine. Examples of polyoxyethyleneacylamine are polyoxyethylenedecanoylamine, polyoxyethyleneundecanoylanine, polyoxyethylenedodecanoylamine, polyoxyethylenetridecanoylamine, polyoxyethylenetetadecanoylamine, polyoxyethylenepentadecanoylanine, polyoxyethylenehexadecanoylamine, polyoxyethyleneheptadecanoylamine, polyoxyethyleneoctadecanoylamine, polyoxyethylenenonadecanoylanine, polyoxyethyleneeicosanoylamine, and the like.

Surface active agents other than the above described surface active agents and having flocculation effect for the scale crystal cause flocculation of the seed crystal and accompanying decrease of the number of seed crystal, thereby lowering the effect of preventing the scale from being deposited. In addition, it is not preferable to use electrolyte surface active agents such, for example, as sodium polyacrylate, sodium alginate and the like since these surface active agents cause flocculation when the scale component in the sea water becomes oversaturated and accompanying flocculation of the seed crystal. The use of anion surface active agents is also not preferable since they are liable to deposite the scale on the inside vessel wall.

The sole use of the surface active agent is less effective in preventing the scale from being deposited by one several tenths than the use of a mixed seed crystal consisting of calcium carbonate and magnesium hydroxide.

Thus, it is necessary to use the surface active agent together with the seed crystal.

In case of using the surface active agent together with the seed crystal, it is effective to add at least 1 ppm (parts by weight) of the surface active agent to sea water. Any amount more than 1 ppm of the surface active agent may be used without hindrance, but it is preferable to use at most 100 ppm of the surface active agent from an economical standpoint. The use of the surface active agent on the order of 2 to 10 ppm is particularly effective in preventing the scale from being deposited. The use of the surface active agent is capable of reducing the relative amount of the seed crystal to be added to sea water by the conventional methods. The amount of the seed crystal to be added to sea water is 0.1 to 10% by weight and preferably 1 to 2% by weight. This amount is sufficiently effective in preventing the scale from being deposited and is also practical from an economical standpoint.

The above described method can be applied to the production of fresh water from sea water with significantly superior effect of preventing scale from being deposited if compared with the sole use of the seed crystal. Experimental tests have yielded the result that the rate of deposit of scale is less than 0.1 $g/m^2/h$ with a concentration ratio of sea water of about 2 at a sea water temperature of 95° to 98°C.

The alkaline scale mainly consists of magnesium hydroxide and calcium carbonate. As a result, it is preferable to add these compounds as the seed crystal to sea water in the form of a mixture of these compounds rather than separately adding these compounds. It is preferable to make the amount of magnesium hydroxide in the seed crystal 50 to 25% by weight in view of the scale growing speed and the method of recovering scale.

The invention will now be described in greater detail with reference to practical examples.

EXAMPLE 1

1% by weight of seed crystal composed of calcium carbonate having a grain size of 325 to 50 mesh and magnesium hydroxide having a grain size of $10\mu$ to several tens $\mu$ and with a mixed weight ratio of 1:1 together with cation surface active agent consisting of cetyldimethylbenzyl ammonium chloride were added to sea water. The rate of deposit of scale in the sea water was measured by the batch method every time the amount of the cation surface active agent to sea water was changed. The minimum amount of the cation surface active agent was made 1 ppm. In addition, 1% by weight of the above described seed crystal together with 1 ppm of nonionic surface active agent consisting of polyoxyethylene-stearylamine were added to sea water and the rate of deposit of scale was measured.

The rate of deposit of scale was measured based on the rate of deposit of scale 100 when the seed crystal only was added to sea water.

The results thus measured are shown in the following Table.

Table

| Test No. | Additive | Amount added | Amount of scale deposited | Rate of deposit of scale |
|---|---|---|---|---|
| 1) | Seed Crystal ($CaCO_3$+$Mg(OH)_2$=1:1) | 1% | 180 | 100 |
| 2) | Seed Crystal ($CaCO_3$+$Mg(OH)_2$=1:1) Cetyldimethylbenzyl ammonium chloride | 1% 50 ppm | 2 | 1.1 |
| 3) | Seed Crystal ($CaCO_3$+$Mg(OH)_2$=1:1) Cetyldimethylbenzyl ammonium chloride | 1% 25 ppm | 5 | 2.8 |
| 4) | Seed Crystal ($CaCO_3$+$Mg(OH)_2$=1:1) Cetyldimethylbenzyl ammonium chloride | 1% 5 ppm | 5.6 | 3.1 |
| 5) | Seed Crystal ($CaCO_3$+$Mg(OH)_2$=1:1) Cetyldimethylbenzyl ammonium chloride | 1% 1 ppm | 11.2 | 6.2 |
| 6) | Seed Crystal ($CaCO_3$+$Mg(OH)_2$=1:1) | 1% | 128 | 100 |
| 7) | Seed Crystal ($CaCO_3$+$Mg(OH)_2$=1:1) Polyoxyethylene-stearylamine | 1% 1 ppm | 3 | 2.3 |

As seen from the above Table, in the test Nos. 1 and 6 are shown the results obtained by the conventional methods in which the seed crystal only is added to sea water, respectively. In the test Nos. 2 to 5 and 7 are shown the results obtained by the method according to the invention in which in the test Nos. 2 to 5 the seed crystal and 50 ppm, 25 ppm, 5 ppm and 1 ppm of cetyldimethylbenzyl ammonium chloride are added to sea water, respectively. While in the test No. 7 the seed crystal and 1 ppm of polyoxyethylenestearylamine are added to sea water.

In the above tests, the seed crystal was obtained from the apparatus for carrying out the method according to the invention.

The results in the test Nos. 1 to 5 shown in the above table were measured from test pieces impregnated with sea water having a concentration ratio of 2 for 4 hours at a sea water temperature of 95° to 98°C, respectively, while the results in the test Nos. 6 and 7 shown in the above table were measured from the same test piece impregnated with sea water having a concentration ratio of 2 for 3 hours at a sea water temperature of 95° to 98°C.

In the tests shown in the above table, use was made of the cation surface active agent consisting of the quaternary ammonium salt whose alkyl group has a carbon number of 16 and the nonionic surface active agent whose alkyl group has a carbon number of 18 representing the cation and nonionic surface active agents adapted to be used in the method according to the invention, respectively.

The carbon number of the alkyl group, alkenyl group and acyl group may be increased or decreased irrespective of the function and effect of the method according to the invention. The inventors have found out that substantially the same results as those shown in the above table are obtained even when use is made of cation and nonionic surface active agents other than those shown in the above table.

As seen from the results shown in the above table, the use of the surface active agents selected according to the invention together with the seed crystal for the alkaline scale makes it possible to decrease the amount of alkaline scale deposited by a factor of at least 1/10 smaller than that when use is made of the speed crystal only. The use of 50 ppm of the surface active agent can decrease the amount of scale deposited by a factor of 1/90 smaller than when the use is made of the seed crystal only. Even when use is made of 1 ppm of the surface active agent, the amount of scale deposited becomes decreased by a factor of 1/16. Thus, the method according to the invention is capable of preventing the scale from being deposited on the inside vessel wall in which sea water is heated at a temperature of 95° to 98°C and with a concentration ratio of 2. In the method according to the invention, the amount of the surface active agent required for obtaining the above described result is of at least 1 ppm.

EXAMPLE 2

In the drawing are shown the results obtained by the method according to the invention compared with those obtained by the conventional methods with or without adding seed crystal and surface active agent separately with the aid of a multiple state flash evaporator.

A curve 1 shows the results obtained by the conventional method in which no additive is added to sea water and use is made of evaporation only. A curve 2 shows the results obtained by the conventional method in which 2% by weight of a mixture composed of calcium carbonate and magnesium hydroxide with the same weight ratio is added to sea water. A curve 3 shows the results obtained by the conventional method in which 5 ppm of a nonionic surface active agent consisting of polyoxyethylenestearylamine is added to sea water. A curve 4 shows the results obtained by the method according to the invention in which 2% by weight of the mixture composed of calcium carbonate and magnesium hydroxide with the same weight ratio together with 5 ppm of the nonionic surface active agent consisting of polyoxyethylene stearylamine are added to sea water.

The curves 1, 2 and 4 show the rate of deposit of scale on the inner surfaces of heat transfer tubes with a concentration ratio of brine 2±0.05 at a temperature range from the highest temperature 120° to 50°C, while the curve 3 shows the rate of deposit of scale with the same concentration rate of brine 2 at a temperature range from the highest temperature 90° to 50°C.

As seen from the results shown in the drawing, the method according to the invention can exhibit a synergetic effect of the seed crystal and the surface active agent at temperatures in the range from a low temperature to a high temperature if compared with the conventional methods in which the seed crystal and the surface active agent are separately added to sea water.

In the evaporator, sea water is evaporated at a heat transfer tube outlet temperature of 110° to 90°C. As seen from the drawing, the invention provides the important advantage that the scale is prevented from being deposited on the inside vessel wall at the above described temperature range.

On the contrary, the conventional methods have the disadvantage that considerably large amount of scale is deposited on the inside vessel wall at the temperature range of 110° to 90°C as shown in the curves 1 to 3.

In the apparatus for producing fresh water from sea water, if the rate of deposition of scale becomes smaller than 80 mg/m$^2$/h, the heat transfer rate is not lowered even after a long operation.

As seen from the drawing, the invention is capable of reducing the rate of deposit of scale at most 8.0 mg/m$^2$/h at 60°C, which is sufficient in practice, and hence is capable of maintaining the heat transfer rate at a value which is sufficient to operate the apparatus without hindrance.

If the seed crystal with its composition ratio changed but without changing its total amount is added to sea water, the more $CaCO_3$ in the seed crystal the lesser the effect of magnesium hydroxide, and as a result, much amount of magnesium hydroxide is produced at the high temperature region. In addition, if much amount of calcium carbonate is contained in the seed crystal, the calcium carbonate becomes less effective, thereby depositing much amount of calcium carbonate at a temperature lower than 120°C.

The inventors have found out that the weight ratio of calcium carbonate to magnesium hydroxide should preferably be 1:1 to 0.25 because in such range of the weight ratio much amount of both calcium carbonate scale and magnesium hydroxide scale are not deposited.

What is claimed is:

1. A method of preventing scale from being deposited in case of producing fresh water from sea water by heating the sea water at a temperature not higher than 120°C to obtain a concentration ratio of not larger than 2 and by condensing water vapour evolved to obtain the fresh water, comprising adding to the sea water 0.1 to 10% by weight of at least one seed crystal selected from the group consisting of magnesium hydroxide and calcium carbonate and 1 to 100 ppm of at least one surface active agent selected from the group consisting of alkyldimethylbenzyl ammonium chloride, alkenyldimethylbenzyl ammonium chloride, acyldimethylbenzyl ammonium chloride, polyoxyethylenealkylamine, polyoxyethylenealkenylamine, and polyoxyethylenacylamine, the carbon number of the alkyl group, alkenyl group and acyl group being 10 to 20.

2. A method as claimed in claim 1 wherein said surface active agent is one selected from the group consisting of cetyldimethylbenzyl ammonium chloride and polyoxyethylenestearylamine.

3. A method as claimed in claim 1 wherein said surface active agent is used on the order of 2 to 10 ppm.

4. A method as claimed in claim 1 wherein 1 to 2% by weight of said seed crystal is added to the sea water.

5. A method as claimed in claim 1 wherein the amount of magnesium hydroxide in said seed crystal is 50 to 25% by weight.

6. A method as claimed in claim 1 wherein said calcium carbonate and magnesium hydroxide are a mixture containing these compounds with a weight ratio of 100:100 to 25.

* * * * *